3 Sheets—Sheet 1.

B. F. STEWART.
Car-Brake.

No. 213,305. Patented Mar. 18, 1879.

Fig. 1

Witnesses:
John C. Tunbridge
T. B. Mosher

Inventor:
Benjamin F. Stewart
by his attorney
A. v. Briesen

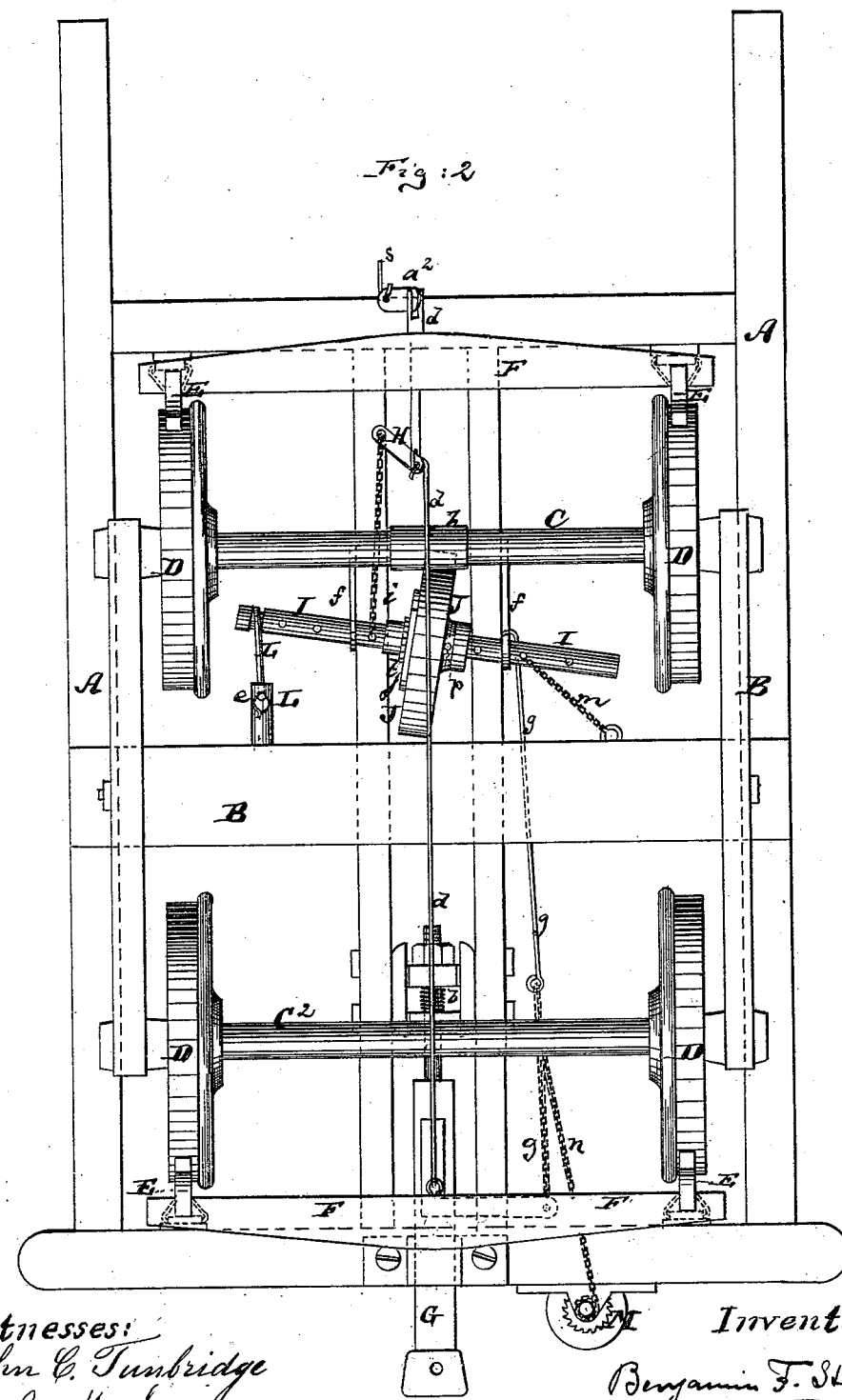

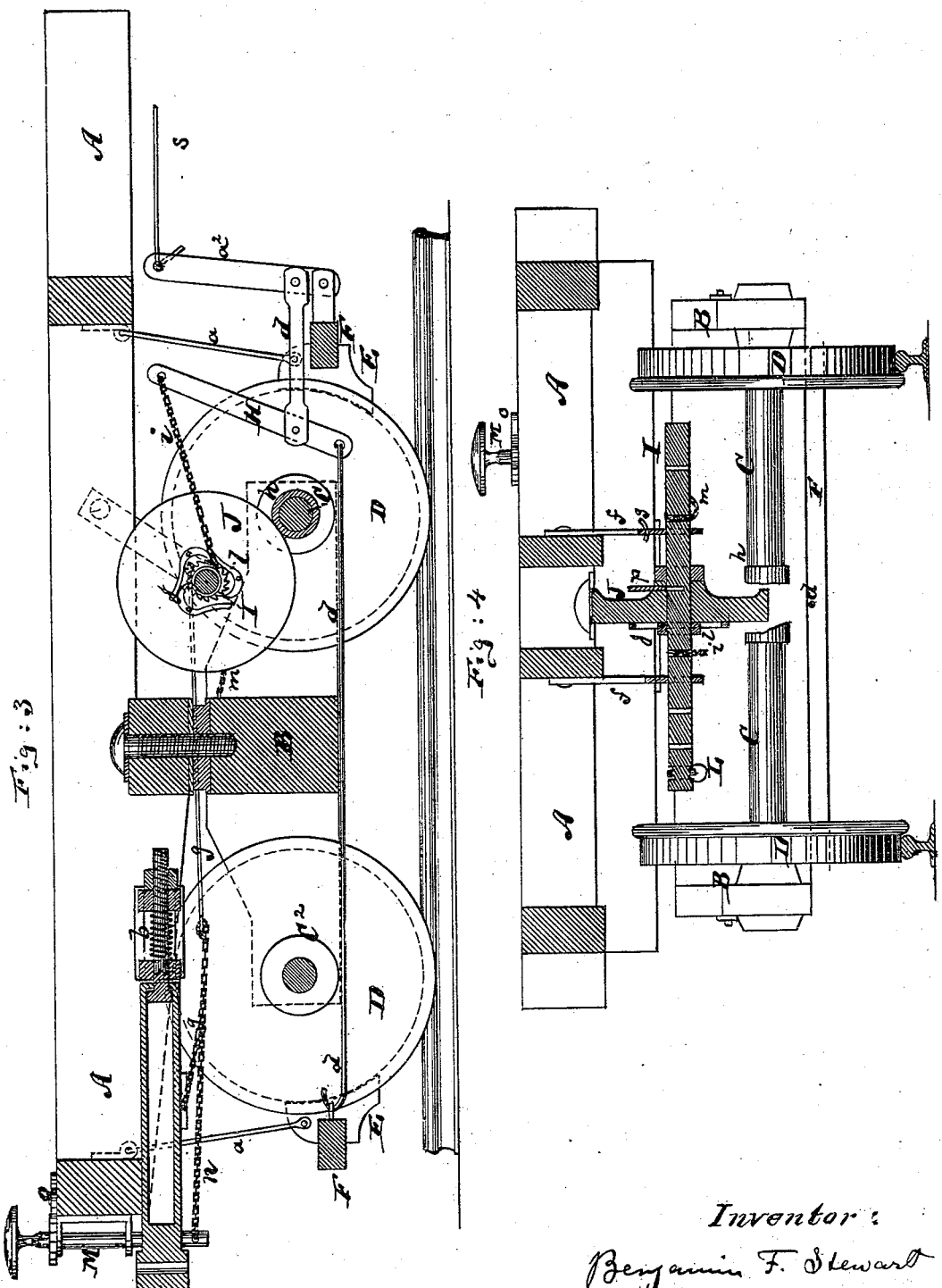

UNITED STATES PATENT OFFICE.

BENJAMIN F. STEWART, OF NEW PHILADELPHIA, OHIO, ASSIGNOR OF ONE-HALF HIS RIGHT TO DAVID A. HOPKINS, OF PARK RIDE, N. J.

IMPROVEMENT IN CAR-BRAKES.

Specification forming part of Letters Patent No. 213,305, dated March 18, 1879; application filed December 16, 1878.

*To all whom it may concern:*

Be it known that I, BENJAMIN F. STEWART, of New Philadelphia, in the county of Tuscarawas and State of Ohio, have invented a certain Improvement in Car-Brakes, of which the following is a specification:

Figure 1, Sheet 1, represents a top view of a railroad-car containing my improved brake. Fig. 2, Sheet 2, is a bottom view of the same. Fig. 3, Sheet 3, is a longitudinal vertical section on the line $c\ c$, Fig. 1; and Fig. 4, Sheet 3, is a vertical transverse section on the line $k\ k$, Fig. 1.

Similar letters of reference indicate corresponding parts in all the figures.

This invention relates to a new automatic car-brake, and contains certain improvements on the invention described in Letters Patent No. 185,461, dated December 19, 1876.

The invention consists, first, in connecting and fastening the draw-head, by means of a chain, with the vibrating shafts of a friction-wheel, which wheel, when revolved, draws the brakes against the wheels.

The invention also consists in a peculiar manner of hanging said friction-wheel or windlass, so that its shaft may be vibrated and moved laterally, and also in connecting the vibrating shaft of said wheel to a brake-staff or hand-wheel, so that the brake may be operated by hand, in the peculiar manner hereinafter described, or alternately by traction and by hand, as may be desired.

The invention also consists in the use of a check-chain, to render the device self-operating in case the wheel should become clogged on its shaft, all as hereinafter described.

In the accompanying drawings, the letter A represents the frame-work of a car, and B the frame-work of one of the trucks, which is swiveled under the car in the usual manner. The car has, of course, generally two trucks, although but one is shown, the brake devices being the same on each, in order that it may be made to operate in either direction in which the train is being drawn.

The truck consists, as a matter of course, of two axles, C and $C^2$, each of which carries two wheels, D, as indicated. To each pair of wheels there is a set of brakes, E, that are fastened to cross-bars F, suspended by suitable links $a$ from the frame-work of the car, the two cross-bars F being united by rods $d$ and pivoted levers H, so that the brakes will be applied to and withdrawn from the wheels simultaneously.

G is the draft-bar, fitted into the end of the car-frame in the usual manner, so that it may be coupled to another car, and is made sliding in the frame A, so that when traction is applied the draft-bar will be moved lengthwise a certain extent to contract a spring, $b$, before the power will be applied to the car by it.

Somewhat in front of the rear axle, C, and above the same, or, in other words, above the rear axle, C, and between that and the draft-bar G, is hung the shaft I of the friction-wheel or windlass J. One end of this shaft I is hung in a jointed bracket, L, Fig. 2, which bracket is secured in the frame of the truck B, and has a vertical joint, as shown at $e$. The shaft I is further hung in vibrating hangers $f$, that are pivoted to the frame A of the car, as clearly shown in the drawings.

By this connection the shaft I is able to swing into an oblique position, as indicated in Fig. 2, the hangers $f$ yielding to that motion, and it is also able to move laterally, so that it may remain parallel with the axles when the brakes are applied while the car runs on a curve. The lateral motion is made possible by the joint $e$ in the bracket L. The draft-bar G connects by a draw-chain, $g$, with one of the hangers $f$, as shown.

As far as now described the device is an automatic and completely-operating brake. The weight of the wheel J carries it against a cushioned portion, $h$, of, or collar or sleeve upon, the axle C when the devices are placed as indicated in Fig. 3. In this position the wheel is in frictional contact with the axle.

By a chain, $i$, the shaft I connects with the lever H, and the rotation of the shaft I will cause the chain $i$ to be wound upon the same, and the lever H to be moved on its pivot, so as to apply the brakes by its connection therewith through the rods $d$. The moment, however, that traction is applied to the draft-bar G the chain $g$ is pulled, and draws the shaft I into the oblique position shown in Fig. 2, thereby moving the wheel J off the axle C and releasing the brakes. Thus, whenever a car is being pulled, the brakes will be off, and as soon as the draft-bar G is not being pulled the brakes will be automatically applied. This arrangement is particularly desirable in preventing accidents, because it insures the prompt application of the brakes to the wheels of the car whenever from any cause whatever the draft-bar is no longer pulled, which happens when the cars become uncoupled, or when from any cause the locomotive ceases to advance.

The wheel J is loose on the shaft I, and becomes locked thereto by pawls $j$ and ratchet $l$, (shown in Fig. 3,) so that when turned in one direction by the advance movement of the car the wheel will revolve the shaft I; but when the car is being backed, the application of the brakes is not only unnecessary, but absolutely objectionable, and will be avoided by the wheel J revolving loosely on the shaft I, and failing therefore to wind the chain $i$ upon said shaft. But in order to make sure that the brakes will not be applied to the wheels of the car when the latter is being backed, I have connected the free end of the shaft I to a check-chain, $m$, which fastens to the frame of the truck.

Should the wheel J fail to slip or to run loose on the shaft I during the backward motion of the car, the rotation of the shaft thereby produced will cause the check-chain $m$ to be wound upon the shaft, and thus cause the shaft itself to be pulled away from the axle into the oblique position indicated in Fig. 2. Thus by means of the check-chain the proper operation of the device when backing up is also made automatic, even in case of the friction-wheel or windlass being firmly fastened to its shaft I, which is sometimes desirable, and may be effected by turning the set-screw $p$, Fig. 4. Another chain, $n$, joins the stem or upright shaft M of a hand-wheel to the draft-chain $g$, or, if desired, directly to one of the hangers $f$. Whenever the chain $n$ is partly wound upon the shaft M, by turning the hand-wheel thereon the friction-wheel J is pulled away from the axle C, and the brake is thus off. In this position the shaft M is locked by a suitable catch or pawl, $o$.

In order to apply the brake it is only necessary to move the pawl or catch $o$, so as to release the shaft M, whereupon the wheel J, by its weight and that of its shaft, will immediately drop into contact with the axle C and cause the brakes to be applied.

Thus it appears that as far as my apparatus applies to the hand-brake, it differs from any hand-brake heretofore used in causing the brakes to be applied by slackening the chain that leads to the hand-wheel. This I deem a very important improvement, because in the moment of danger it enables the brakeman, by a mere touch of the pawl $o$, to instantaneously and securely apply the brakes, whereas heretofore much labor and effort were necessary to turn the hand-wheel and pull the brakes into the proper position.

Now, of course, if this is to be an automatic brake, the hand-wheel cannot be used while the draft-bar G is being pulled, or, in other words, while the train is in motion, nor, vice versa, can the draft-bar be used to apply the brakes if the latter are to be operated by hand; but by branching the chain $n$ from the chain $g$, as shown in Fig. 1, I am at liberty to use either the automatic or the hand brake, as I may desire, the automatic brake being always ready for action, while the hand-brake can be used as soon as the front end of the chain $g$ is unfastened from its connection with the draft-bar at G, all of which is evident.

In order to vary the power of the apparatus I provide the shaft I with a series of holes, in either of which the chain $i$ or the chain $m$ can be secured, it being quite evident that the power of the chain $m$ varies in its effect upon the brake mechanism as said chain is secured nearer to or farther from the wheel, and it is equally evident that in like manner the power of the chain $i$, as applied to the brake mechanism, must vary according to the distance of the connection of said chain from the pivoted end of the shaft I, being that end which is hung in the jointed bracket L.

$s$ is a portion of the rod ordinarily used in connecting the brakes of one truck with those of the other. It connects with the lever $a^2$, as shown in Fig. 3, and transmits the motion from truck to truck in proper manner.

I claim—

1. The combination of the draw-head or draw-bar G and chain $g$ with the vibrating shaft I of the friction-wheel J, and with the axle C, for operating a brake automatically as soon as traction ceases, substantially as specified.

2. The combination of the vibrating shaft I and frictional wheel J, in a car-brake mechanism, with the bracket L, having joint $e$, substantially as specified.

3. The combination of the vibrating hangers $ff$ and jointed bracket L with the shaft I and frictional wheel J, substantially as and for the purpose described.

4. The combination of the check-chain $m$ with the vibrating shaft I, frictional wheel J, and axle C of a car-brake mechanism, substantially as and for the purpose described.

5. The combination of the hand-wheel and its shaft M and locking-pawl $o$ with the chain $n$, and with the draft-chain $g$, that connects to the draw-head G, vibrating shaft I, and frictional wheel J, all arranged to permit the alternate use of the draw-head and hand-wheel, substantially as specified.

6. A car-brake combined with a hand-wheel and its shaft M, chain $g$, and vibrating-shaft I, in such manner that the shaft I is released to drop into frictional contact with the car-axle by slackening the chain $n$, that joins the shaft M, substantially as shown and described.

BENJAMIN F. STEWART.

Witnesses:
T. B. MOSHER,
W. H. C. SMITH.